(12) United States Patent
Beatch

(10) Patent No.: US 12,020,728 B2
(45) Date of Patent: Jun. 25, 2024

(54) SYSTEMS AND METHODS FOR GENERATING VIDEO COMPILATIONS FOR TRACKED ACTIVITIES

(71) Applicant: Kyle Quinton Beatch, Grand Cayman (KY)

(72) Inventor: Kyle Quinton Beatch, Grand Cayman (KY)

( * ) Notice: Subject to any disclaimer, the term of this patent is extended or adjusted under 35 U.S.C. 154(b) by 224 days.

(21) Appl. No.: 17/836,890

(22) Filed: Jun. 9, 2022

(65) Prior Publication Data

US 2022/0399042 A1 Dec. 15, 2022

Related U.S. Application Data

(60) Provisional application No. 63/209,245, filed on Jun. 10, 2021.

(51) Int. Cl.
*G11B 27/036* (2006.01)
*G06T 7/80* (2017.01)
*G11B 27/00* (2006.01)

(52) U.S. Cl.
CPC ............ *G11B 27/036* (2013.01); *G06T 7/80* (2017.01); *G11B 27/005* (2013.01); *G06T 2207/10016* (2013.01)

(58) Field of Classification Search
CPC ....... G11B 27/036; G11B 27/005; G06T 7/80; G06T 2207/10016
See application file for complete search history.

(56) References Cited

U.S. PATENT DOCUMENTS

2015/0297949 A1* 10/2015 Aman ................. G06T 7/246
 348/157
2020/0053401 A1* 2/2020 Obara ................. G11B 27/005
2022/0171970 A1* 6/2022 Yadav ................. H04N 23/667

* cited by examiner

*Primary Examiner* — Sunghyoun Park
(74) *Attorney, Agent, or Firm* — McDonnell Boehnen Hulbert & Berghoff LLP

(57) ABSTRACT

Systems and methods disclosed herein include a method implemented by a computing system, the method comprising: receiving tracking data associated with a tracked event and executing an automated video processing procedure including: (i) initiating one or more live video feeds of the tracked events; (ii) receiving a first live video feed of a first portion of the tracked event; (iii) selecting one or more segments of the received first live video feed for further processing; (iv) receiving a second live video feed of a second portion of the tracked event; (v) selecting one or more segments of the received second live video feed for further processing; (vi) modifying the selected one or more segments to improve performance of the automated video processing procedure; and (vii) compiling the modified one or more segments into a first video of the tracked event.

22 Claims, 4 Drawing Sheets

SYSTEMS AND METHODS FOR GENERATING VIDEO COMPILATIONS FOR TRACKED ACTIVITIES

RELATED APPLICATION

This application claims priority to U.S. Provisional Application No. 63/209,245 filed Jun. 10, 2021, which is incorporated herein by reference in its entirety.

TECHNICAL FIELD

The systems and methods disclosed herein relate generally to producing recordings of tracked events, such as in the context of indoor and outdoor tracked sporting and adventure activities.

SUMMARY

Example embodiments relate to a computing system that allows for the effective tracking of participants and operators of tracked activities and events, as well as capturing, modifying, and compiling video segments of the tracked activities and events, all of which may be used to make a video and/or other graphical representations of the tracked activities and events. In some embodiments, the computing system receives tracking data associated with a tracked event. In response to receiving the tracking data, the computing system executes an automated video processing procedure that comprises initiating one or more live video feeds of the tracked event, wherein each live video feed is streamed from a separate camera during the tracked event. Then, the computing system receives a first live video stream feed of a first portion of the tracked event and selects one or more segments of the first live video feed for further processing. Further, the computing system receives a second live video stream feed of a second portion of the tracked event and selects one or more segments of the second live video feed for further processing. Then, the computing system modifies each of the one or more segments of the received first and second live video feeds to improve performance of the automated video processing procedure and compiles the modified video segments into a first video of the tracked event.

Furthermore, because this video processing procedure is automated (or at least semi-automated), and occurs in real time (or substantially real time) while a participant is engaged in the tracked event and/or activity, any editing and/or compilation procedures also occur during the activity and are completed at the same time, or at substantially the same time, that the participant completes the activity, so the participant and the user are able to focus on the activity, and not the recording and/or editing processes. This result saves the participant (and the user) time and effort and allows them to focus on the activity exclusively and maximizes the participant's level of satisfaction with the activity and the experience.

In some embodiments, a method is provided that includes receiving, by a computing system, tracking data associated with a tracked event. The method further includes, in response to the receiving the tracking data, executing an automated video processing procedure comprising: (i) initiating one or more live video feeds of the tracked event, wherein each live video feed is streamed from a separate camera during the tracked event, (ii) receiving a first live video feed of a first portion of the tracked event, (iii) selecting one or more segments of the received first live video feed for further processing, wherein the one or more segments of the received first live video feed are selected based on the received tracking data, (iv) receiving a second live video feed of a second portion of the tracked event, (v) selecting one or more segments of the received second live video feed for further processing, wherein the one or more segments of the received first live video feed are selected based on the received tracking data; (vi) for each of the selected one or more segments of the received first live video feed and the second live video feed, modifying the selected one or more segments to improve performance of the automated video processing procedure; and (vii) compiling the modified one or more segments into a first video of the tracked event.

Some embodiments include a system comprising at least one processor and a tangible, non-transitory computer readable medium having stored therein instructions that, when executed by the at least one processor, cause the at least one processor to perform functions, including but not limited to the functions described herein. The system includes one or more tracking devices configured to transmit tracking date, which the system may use to determine a first video of a tracked event and/or activity should be generated, wherein the tracked event and/or activity comprises one or more portions of the tracked event and/or activity. In operation, in response to receiving the tracking data, the system executes an automated video processing procedure comprising: (i) initiating one or more live video feeds of the tracked event, wherein each live video feed is streamed from a separate camera during the tracked event, (ii) receiving a first live video feed of a first portion of the tracked event, (iii) selecting one or more segments of the received first live video feed for further processing, wherein the one or more segments of the received first live video feed are selected based on the received tracking data, (iv) receiving a second live video feed of a second portion of the tracked event, (v) selecting one or more segments of the received second live video feed for further processing, wherein the one or more segments of the received first live video feed are selected based on the received tracking data; (vi) for each of the selected one or more segments of the received first live video feed and the second live video feed, modifying the selected one or more segments to improve performance of the automated video processing procedure; and (vii) compiling the modified one or more segments into a first video of the tracked event.

It should be noted that this summary is for the purposes of illustration only. Specifically, this summary should not be read in any way as limiting to the aspects, examples, and embodiments of the claimed invention disclosed herein.

DETAILED DESCRIPTION

Figure 1:
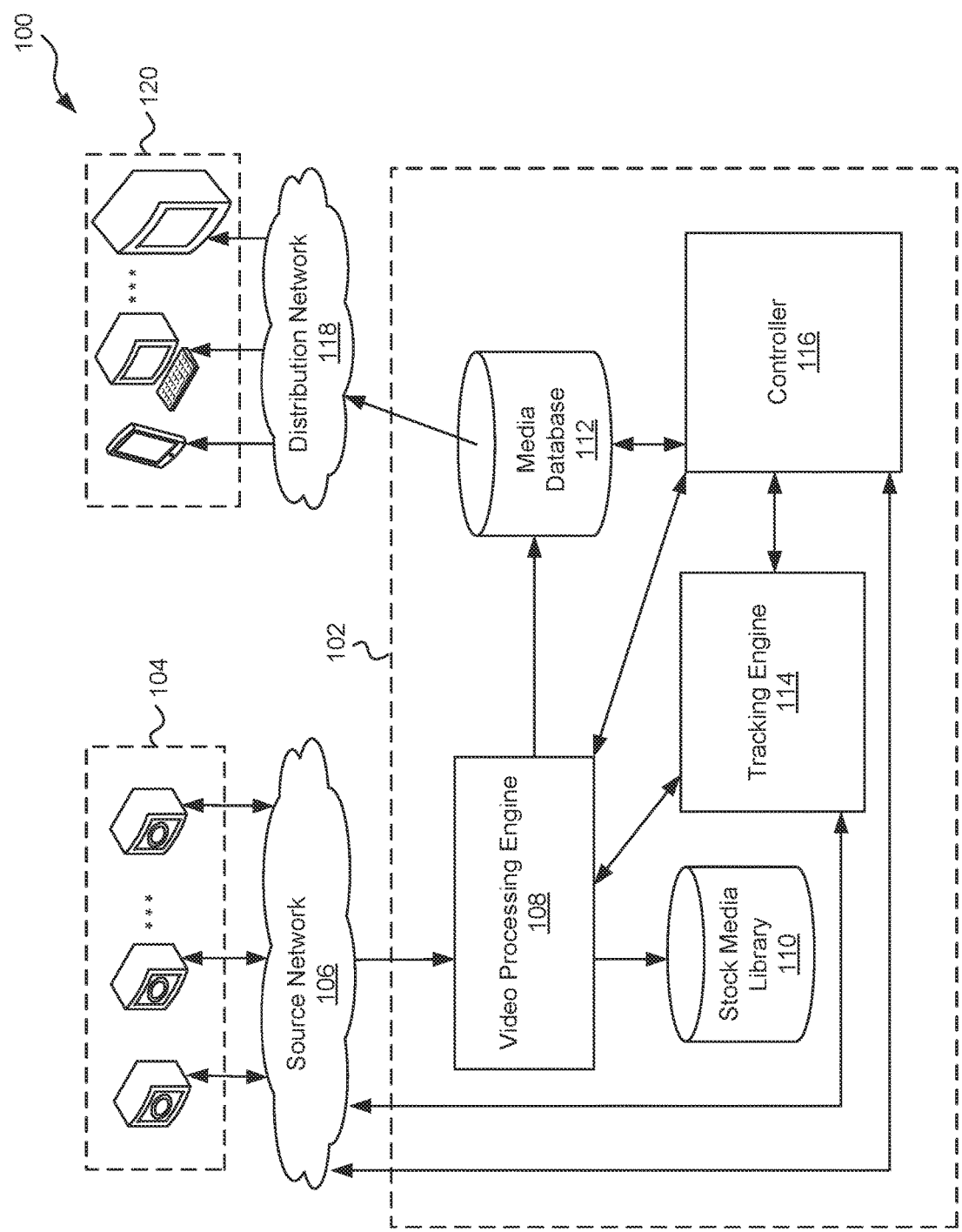
FIG. 1 depicts a system architecture, in accordance with example embodiments.

Example methods and computing systems are described herein. Any aspect, example, or embodiment described herein should not be construed as preferred or advantageous over other potential embodiments or features. Instead, it should be easily and readily understood that certain aspects of the disclosed computing systems and methods can be arranged and combined in a host of different ways.

Additionally, the arrangements reflected in the Figures should not be regarded as limiting, but instead should be viewed as examples only. Further, these examples and others could contain more or fewer of any given element, a different arrangement of those elements, and/or, the deletion of one or more of those elements and/or the addition of one or more other elements.

I. Overview

In the context of recording indoor and outdoor tracked events and/or activities, cameras are often used to capture video while attached to one or more parts of the equipment used to facilitate the activity or activities. For example, if the activity is driving and/or racing recreational vehicles (e.g., go-karts, all-terrain vehicles, motorcycles, etc.) around a track (e.g., go-kart tracks, all-terrain vehicle tracks, etc.), one or more cameras may be attached to recreational vehicle and/or the participant. These configurations, however, may be focused, statically, on a particular angle or direction of the recreational vehicles and/or the participant's face.

When used in this fashion, the video captured by such cameras are often non-dynamic and of a static viewpoint, which may lead to uninteresting, unnecessarily long, and/or corrupted video segments—from the perspective of the participant, spectators, or others.

During the recording of such a tracked event, the it may be beneficial to record different portions of the tracked event from different cameras and, once the recording is completed, how to arrange the recorded footage to make a correctly ordered video and/or determine if the final video recording is compliant with one or more predetermined parameters.

Disclosed herein are systems configured to control multiple cameras and produce an auto-edited compilation of images and/or videos of a tracked activity, as well as methods for operating the disclosed systems. Specifically, the example embodiments disclosed herein allow a computing system, once it received tracking data associated with a tracked event, to accurately and efficiently carry out the tasks associated with capturing, altering, and compiling of video segments generated from live video feeds received by the computing system into a video or videos of the tracked event or activity.

In operation, the systems and methods disclosed herein allow the computing system, without intervention from the participant, spectator, and/or manager of the tracked event, to automatically detect a tracked event is happening, record and edit different portions of the tracked event, and compile a finished video of the tracked event. By doing so, the participant, spectators, and/or managers of the tracked event may focus their attention and efforts on participating in, overseeing, and/or spectating the tracked event instead of recording it. In a further aspect, the systems and methods disclosed herein are also applicable to any tracked activity, tracked event, tracked adventure sport, tracked amusement ride, tracked excursion tour, or similar circumstances which involves participants and where multi-captured and multi-angle footage is of benefit for tracked events and/or activities.

For example, in one scenario, the computing system is configured to receiving tracking data associated with a tracked event, and may do so in a number of ways. In one example, the computing system may receive data from a tracking sensor on recreational vehicles (e.g., a GPS sensor on a go-kart), at a track (e.g., a motion sensor that detects a go-kart going by on the tracks), and/or both, among other possibilities.

In any event, once the computing system receives this tracking data, and in some instances in response to receiving the tracking data, the computing system may execute an automated video processing procedure. In some embodiments, the automated video processing procedure comprises, among other elements: initiating one or more live video feeds of the tracked event, receiving a first live video stream feed of a first portion of the tracked event, and selecting one or more segments of the first live video feed for further processing. Furthermore, in some embodiments, the computing system may also receive a second live video stream feed of a second portion of the tracked event, selects one or more segments of the second live video feed for further processing, and then modify each of the one or more segments of the received first and second live video feeds to improve performance of the automated video processing procedure, all before and compiling the modified video segments into a first video of the tracked event.

In some embodiments, compiling the one or more modified video segments comprises combining the one or more modified video segments in a particular order. In some embodiments, the compilation may also include generating a graphical representation of one or more events that occurred during the tracked event (e.g., lap times for one or more go-karts that participated in a go-kart race around the track, the fastest speed for one or more go-karts that participated in a go-kart race around the track). In a further aspect, this generated graphical representation may be based on the tracking data received during the tracked event, and the computing system may interleave and/or overlay the graphical representation with a least a portion of the modified one or more segments, thereby causing the first video to depict an ordered sequence of events representative of the tracked event.

Additionally or alternatively, the computing system may combine the one or more modified video segments with previously recorded stock video segments (which may include intro/outro sequences, and/or video segments of similar activities or environmental surroundings, among other possibilities) and/or stock images (e.g., a company logo and/or intro slide associated with the tracked events), which may also be interleaved, potentially seamlessly, with the generated video segments and/or graphical representations, before being compiled into a video of the activity. In a further aspect, any or all of these segments (both those that are generated and those that were previously recorded) may be altered to ensure consistency across all the segments used in the compiled video of the activity. For example, the generated graphical representation may overlay the graphical representation over a video segment that includes the corresponding recreational vehicle, participant, or both (e.g., the fastest lap time graphic could overlay a video of the corresponding recreational vehicle and participant crossing the finish line).

Additionally or alternatively, the computing system may combine the one or more modified video segments and/or stock video segments/images with previously recorded stock audio music, soundtracks, and/or sound effects (which may include intro/outro music, and/or sound effects for similar activities or environmental surroundings, among other possibilities), and which may also be interleaved, potentially seamlessly, with the generated video segments and/or graphical representations, before being compiled into a video of the activity. In a further aspect, any or all of these audio segments (both those that are recorded during the tracked event and those that were previously recorded) may be altered to ensure consistency across all the audio segments used in the compiled video of the activity.

In other embodiments, at the completion of the activity, a copy of the video produced by the system is (or at least can be) provided to the participant, participants, or others via a variety of mediums. For example the video may be provided to one or more of these parties on a mobile storage device (e.g., a USB flash drive, a cloud-based storage system, etc.), by uploading the video to a website or physical kiosk for review and selection, uploading the video to a social media site/service associated with one of these parties, and/or transferred to a device associated with one of these parties (e.g., a camera, smart phone, tablet or other computing device), among other scenarios.

In some embodiments, the computing system automatically (or at least semi-automatically) adjusts its video capture parameters/settings, as well as the functionality of associated hardware and devices by examining one or more parameters associated with these components through the execution of one or more calibration sequences. For example, in some embodiments, the computing system obtains a calibration video segment from each camera associated with the computing system, compares the calibration video segment to a corresponding reference video segment to evaluate the level of consistency between the video segments, and then configures each camera so that video received from each camera has a consistent look and feel when initially received for processing from its respective camera, thereby reducing the amount of post-video-capture processing required for the compiled video to have a consistent look and feel across the different video segments making up the compiled video. And, in still further embodiments, the computing system automatically (or at least semi-automatically) adjusts the field of view for each (or at least some) of the associated cameras, by comparing the field of view for each camera to a corresponding reference field of view, and adjusting each camera's field of view to improve the likelihood that each camera will capture footage that includes the participants.

In other examples, the computing system, while executing an automated video processing procedure related to tracking data for a first portion of the tracked event (e.g., corresponding to a first portion of a go-kart track), may receive to tracking data for a second portion of the tracked event (e.g., corresponding to a second portion of a go-kart track). In response, the computing system may executes a second automated video processing procedure and may manage the received video streams and/or the steps of the first and second automated video processing steps to ensure no critical data is lost during the execution of one or both of the automated video processes. In some examples, the computing system facilitates this management by executing the first and second automated video processing procedures at the same time (e.g., by parallel processing or other similar processing techniques), and may potentially execute a third, fourth, fifth, or more automated video processing procedures in a similar fashion.

The embodiments described herein that are configured to select and process live video feeds from individual cameras without participant intervention have multiple advantages over alternative procedures that may include collecting and processing video footage captured and operated by one or more participants.

First, because the cameras transmit live video feeds to the computing system in response to tracking data that occurs during the tracked activity, there is no input required from a system operator or event participant to begin, facilitate, or end the live feeds, editing, and/or video compilation of the tracked event. In this regard, the computing system is able to be powered on and ready to operate at any moment and provide a robust video compilation of the tracked activity that will not be corrupted by operator mistakes (e.g., a go-kart track operator forgetting to turn the track cameras on during the activity).

Second, because the computing system can begin and/or end the live streaming feeds from the tracked cameras in response to tracking data corresponding to events occurring during the tracked event, the cameras are not required to record and/or stream at all times. Instead, the computing system may track one or more participants in the tracked event, and only record when the one or more participants are within the field of view of the particular camera. By doing so, the computing system may save computational resources (e.g., storage space associated with videos recorded while the participants are not in the camera's field of view), computing system components (e.g., the system cameras may last longer because of non-continuous use), and/or other costs associated with operating the computing system.

Third, because individual cameras transmit only enough of a live video feed to capture when the participant is in the camera's field of view, the video segments associated with that portion of the live video feed may be transmitted for further processing faster and in more real time. Furthermore, as described above, this process may begin and end without user intervention or input and lead to faster video segment editing and/or modification, as well as faster video compilation because the process automatically occurs in response to the participant being actively engaged in the tracked activity. In a further aspect, because this process is occurring while the participant is engaged in the tracked activity, the computing system may be undertaking the video processing procedure and then, based on the participant finishing the activity, cease recording any video segments and finish the video compilation at the same (or substantially the same) time.

Fourth, because the computing system can access a live video feed from each camera, the computing system can also calibrate and adjust an individual camera's video parameters based on the tracking data associated with tracked event. In some embodiments, the calibration and adjustment procedure is performed before each new activity starts, but the calibration and adjustment could be performed with nearly any desired frequency (e.g., every 5 minutes, 10 minutes, 15 minutes, hour, 2 hours, daily, and so on).

In a further aspect, if for sale, the participant may be more inclined to purchase a finalized video that is immediately available after completing the activity because the participant is still is still engaged in the moments of excitement immediately following the activity, which may diminish quickly. Additionally, such an inclination for purchasing the finalized video benefits the user (and any associated parties) as well as the participant (e.g., if excited about the finalized video, the participant may be more likely to buy other related products from the user, submit positive reviews concerning their impressions of the activity and/or the user, upload/post the finalized video on social media sites (thereby promoting the activity and/or the user, among other such possibilities).

Other advantages of the systems and methods disclosed herein will become apparent to those of skill in the art upon review of the figures and following detailed description.

II. System Architecture

In the following sections, references will be made, in some detail, to various embodiments of the systems and methods disclosed herein. Although the following detailed descriptions provide many details to provide a context to ensure a full understanding of the present disclosure for the reader, these descriptions should not be viewed as limitations. Further, the disclosed systems and methods may be accomplished without all of these specific details.

FIG. 1 shows a system 100, in accordance with example embodiments. More specifically, system 100 includes one or more cameras 104 in communication with a computing system 102 via a source network 106 and one or more destination devices 120 in communication with the computing system 102 via a distribution network 118. In a further aspect, in this example, computing system 102 includes one or more video processing engines 108, a stock media library 110, a media database 112, tracking engine 114, and a controller 116. Furthermore, in some embodiments, one or more of these components may be encased in one or more weatherproof units.

In some embodiments, tracking engine 114 comprises one or more processors programmed with the software that, when executed by the one or more processors, causes or otherwise enables the tracking engine 114 to communicate with and/or control one or more other components in computing system 102 and/or system 100. For example, in some embodiments, tracking engine 114 communicates with one or more tracking devices and, in response to receiving tracking data from the one or more tracking devices, communicates with cameras 104 via a source network 106.

In some embodiments, controller 116 comprises one or more processors programmed with the software that, when executed by the one or more processors, causes or otherwise enables the controller 116 to communicate with and/or control one or more other components in computing system 102 and/or system 100. For example, in some embodiments, controller 116 communicates with one or more cameras 104 via a source network 106.

In some embodiments, in response to receiving tracking data from tracking engine 114, controller 116 selects one or more live video feeds received from the one or more cameras 104. In some embodiments, each live video feed is obtained by an individual camera. In operation, tracking engine and/or controller 116 can communicate with the one or more cameras 104 via the source network 106 in one or more of a variety of ways. For example, this communication may be accomplished via wired connections (e.g., High-Definition Multimedia Interface (HDMI) cables, coaxial cables, Ethernet cables, or any other suitable wireline communication technology now known or later developed) and/or wireless connections (e.g., WIFI, VHF or UHF radio frequencies, or other suitable wireless technologies now known or later developed), among other possibilities.

Additionally, in some embodiments, one or more cameras 104 may be in direct communication with the computing system 102 (e.g., via a source network 106). In a further aspect, one or more cameras 104 may be controlled by one or more components of the computing system 102 (e.g., via a source network 106), including to record and/or otherwise capture video clips (e.g., from live feeds) and send them directly to computing system 102. In other embodiments, cameras source network 106 may be connected to one or more switching devices controlled by tracking engine 114 and/or the controller 116, facilitating which live video feeds are passed from the one or more cameras 104 to the computing system 102 at any given time.

For example, in embodiments where the one or more cameras 104 are connected to the computing system 102 via HDMI cables, the source network 106 includes an HDMI switch (not shown), where the HDMI switch has one input for each of the one or more cameras 104, and at least one output to the computing system 102. In operation, the controller 116 controls which of the live video feeds on each of the HDMI inputs from each camera are passed to the HDMI output(s) to the computing system 102 for processing according to the methods and procedures disclosed and described herein. In some embodiments, the above-described HDMI switch may be a separate component of the source network 106 or an integrated component of the computing system 102.

In another example, rather than controlling an HDMI switch (or other type of switch) configured to implement a switching scheme for passing one or more live video feeds to the computing system for processing, the tracking engine 114 and/or controller 116 may instead directly control the one or more cameras 104 to cause each camera to transmit a live video feed to the computing system at particular times. In yet another example, each camera is configured to transmit a live video feed via a wireless or wireline network to the computing system 102 on a separate physical or virtual channel (e.g., a separate RF channel in a frequency division multiplexed (FDM) scheme, a separate time slot channel in a time division multiplexed (TDM) scheme, a separate source IP address, e.g., the camera's IP address, in a video over IP scheme) and the controller is configured to tune or otherwise configure a physical or virtual receiver (not shown) of the computing system 102 to receive and process one or more of the live video feeds at a particular time.

In a further aspect, in order to determine which one or more live video feeds captured by one or more cameras 104 are selected for further processing, the controller 116 in some embodiments relies on information received from the tracking engine 114, a set of predetermined instructions (e.g., a script that the processors of the controller execute), and/or other input data.

For example, in some embodiments, in response to receiving tracking data from one tracking device associated with tracking engine 114 (e.g., a tracking sensor at the start line of a race), the computing system executes an automated (or at least semi-automated) video processing procedure. In other embodiments, however, the computing system may execute, continue, and/or cease an automated (or at least semi-automated) video processing procedure in response to receiving tracking data from more than tracking device associated with tracking engine 114 (e.g., a tracking sensor at the start line of a race, GPS sensors in one or more recreational vehicles in the race, one or more tracking sensors at various portions of the race track, and/or a tracking sensor at the finish line of a race). In other embodiments, the computing system may receive this tracking data wirelessly (e.g., broadcasting over WiFi), from one or more wired devices, and/or other devices and/or technologies.

In still other embodiments, once the one or more segments of the received live video stream feeds are selected for processing, those segments are received by a video processing engine 108 that processes the received segments in one or more ways. In one example, the video processing engine modifies the selected segment(s) to improve the performance of the computing system in connection with performing the automated video processing procedure. In some embodiments, this modification may include, among other possibilities, compressing the selected segment(s) to reduce the processing load for generating the compiled video, among others.

In a further aspect, once a selected segment has been modified, the video processing engine 108 generates one or more video segments based on one or more of the modified video feeds, which may include a variety of video processing techniques (e.g., recording the video segment in real time and saving it in one or more formats).

In a further aspect, video processing engine 108 may use tracking data from tracking engine 114 to analyze the video segments and/or further influence how the video segments are modified and/or compiled. For example, video processing engine 108 may use tracking data to select and/or modify video segments so that the one or more particular event participants (e.g., a particular go-kart operator) are in the video frame across all cameras and/or camera angles for the entire tracked event. In another example, video processing engine 108 may use tracking data to select and/or modify video segments that pertain to the one or more particular event participants (e.g., the particular go-kart operator) and disregard any video segments that do not include the one or more particular event participants. Other examples are possible.

In yet another aspect, video processing engine 108 compiles the one or more generated video segments into a video of the tracked event in a variety of ways.

For example, in some embodiments, video processing engine 108 compiles the one or more generated video segments into the video of the activity by combining the one or more generated video segments into the video of the activity with no further editing or input.

In other embodiments, however, video processing engine 108 generates a graphical indication of one or more events that occurred during the tracked event. In some embodiments this graphical representation may include and/or be based on tracking data received during the tracked event. In a further aspect, video processing engine 108 may overlay and/or interleave the generated graphical representation with the modified video segments, and then compiles both the generated graphical representations and generated video segments into the video of the tracked activity.

In other embodiments, the video processing engine 108 selects one or more stock video segments from stock media library 110, interleaves the selected stock video segments with the generated video segments, and then compiles both the stock and generated video segments into the video of the activity.

In some embodiments, the computing system 102 (or one or more components thereof) selects the stock video segments based on data detected concerning the operational parameters and/or environmental factors detected by the computing system during the tracked event. For example, the computing system may detect information regarding one or more relevant factors concerning system 100 (e.g., current weather conditions or other environmental information, including lighting, time of day, etc.), which may influence the video processing engine's selection of the stock video segments (e.g., if it is cloudy/overcast, the video processing engine may select only the stock video segments that reflect cloudy/overcast conditions).

In further examples, video processing engine 108 may also alter the generated graphical representations, selected stock video segments, the modified video segments, or both, to achieve a consistent look across the compiled video. For example, if it is rainy and overcast during the tracked event, the computing system may modify the selected live and/or stock video segments, generate graphical representations of the tracked event reflecting the conditions (e.g., cartoon rainclouds and/or thunder next to the fastest lap time), or both, among other possibilities.

In a further aspect, once the video of the tracked activity has been completed and the video is ready to be transferred, the video may be sent (via the video processing engine 108 or the controller 116) to the media database 112. In one example, media data base 112 may serve as both a repository for finished videos (e.g., a storage device for such videos), output interface (e.g., network interface), or both. In a further aspect, the media database 112 may also facilitate communication between one or more destination devices 120 and the computing system 102 via a distribution network 118.

Under either scenario, in example embodiments, similar to communications via source network 106, communications with the one or more destination devices 120 (e.g., mobile devices, computing devices, kiosks, and/or other devices associated with the user, the participant, or another party) via the destination network 118 may be accomplished in a variety of ways (e.g., via wired, wireless, and/or other transmission technologies). In some embodiments, the video may transferred to a SD/USB medium or other tangible memory media. In other embodiments, the video may be uploaded to a website for later download by a party, such as the activity participant. In other embodiments, the video may also be transferred via distribution network 118 to a participant's portable electronic device (e.g., camera, smart phone, tablet computer, or other portable electronic device).

III. Computing Device

Figure 2:
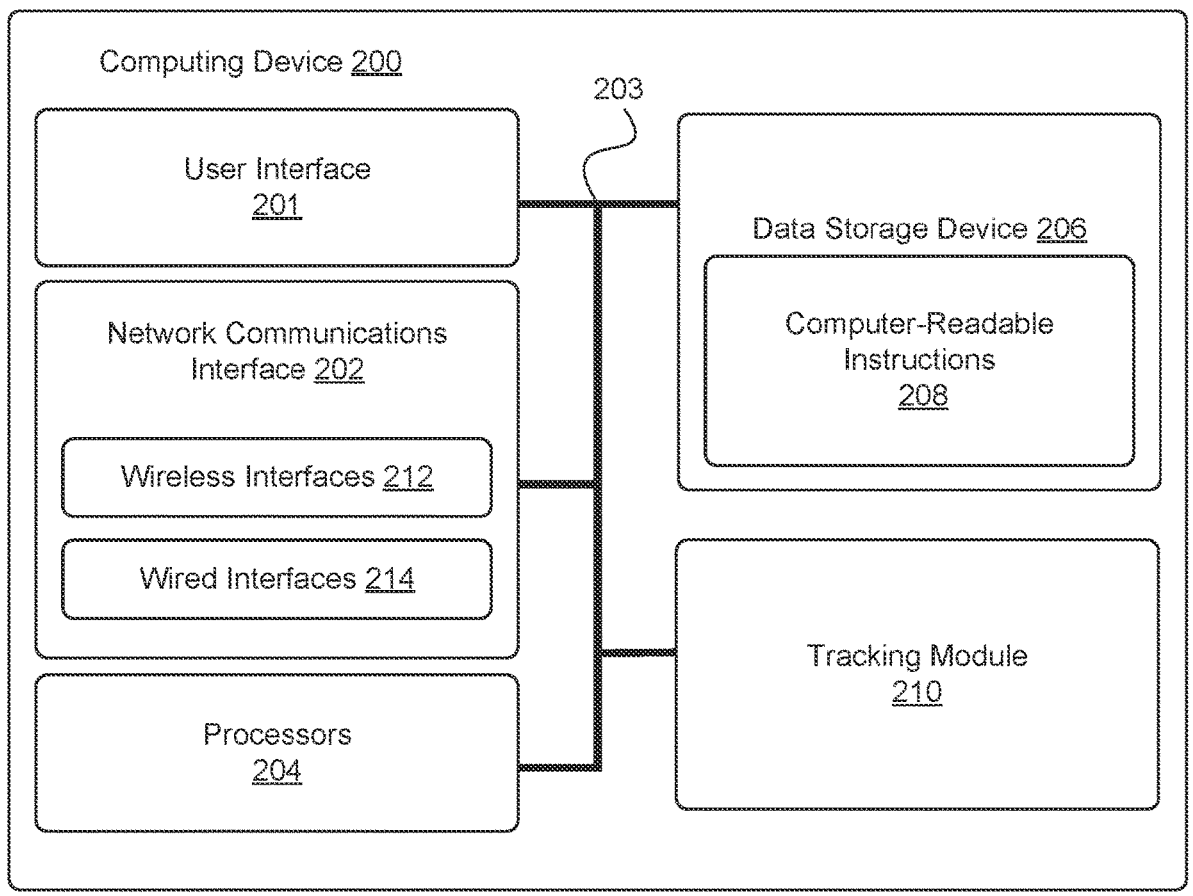
FIG. 2 depicts an example computing device, in accordance with example embodiments.

FIG. 2 illustrates computing device 200 in accordance with example embodiments, which may be configured to perform at least one function of computing system 102, as previously described.

Computing device 200 includes one or more user interfaces 201, a network-communication interface 202, one or more processors 204, and a data storage device 206 with computer-readable instructions 208 stored thereon, all of which may be linked together by a connector 203, such as a system bus or similar mechanism.

In operation, the user interface 201 may be configured to receive and/or convey information and/or data to/from a user. In one example, the user interface 201 is a touch screen that displays one or more graphical user interfaces to receive and convey information from and to the user. In other examples, the user interface 201 receives information and/or data from a user through the use of a computer mouse, a keyboard, one or more cameras, and/or one or more microphones (which may also work in connection with voice recognition software), among other such devices. In other examples, the user interface 201 is configured to convey information and/or data to a user through the use of display devices (which may include LCD, LED, and/or plasma, among other, screens, and/or other similar devices, either now known or later developed) and/or speakers (or an audio output port configured to send an audio signal to an external device), among other similar devices.

Computing device 200 also includes one or more network-communications interfaces 202, which may comprise one or more wireless interfaces 212 and/or one or more wired interfaces 214, both or either of which may be configured to communicate via a network. For example, wireless interfaces 212 may include wireless receivers, wireless transmitters, and/or wireless transceivers, one or more of which may employee technologies such as Bluetooth, WIFI, and/or other similar types of similar technologies. In other examples, wired interfaces 214 may include one or more wired receivers, wired transmitters, and/or wired transceivers, one or more of which may employee technologies such as coaxial, Ethernet, USB, and/or other similar types of similar technologies.

In some example embodiments, the wired interfaces 214 include one or more HDMI interfaces, where each HDMI interface is configured to receive a live video feed from one of the one or more cameras 104 shown and described in FIG. 1.

Computing device 200 also includes one or more processors 204, which are configured to execute computer-readable program instructions 208 that are contained in data storage 206 and/or other instructions as described herein. In operation, the one or more processors 204 are configured to execute the software for controlling the other components of computing device 200.

Computing device 200 also includes one or more data storage devices 206, one or more of which may include one or more computer-readable storage media that can be read and/or accessed by the at least one or more processors 204. In a further aspect, one or more data storage devices 206 can also contain, among other data, computer-readable program instructions 208. And, in some embodiments, data storage 206 can additionally include instructions required to perform at least part of the methods and method steps described herein. In some embodiments, the one or more data storage devices 206 are also configured to store (at least temporarily) one, more, or all of the received live video feeds from the one or more cameras 104, the video segments derived from the live feeds, the generated graphical representations, the stock media library, altered stock and/or modified video segments, and compiled videos generated by the computing system 102.

Computing device 200 also includes one or more tracking modules 210 (e.g., a GPS module), one or more of which may send tracking data the at least one or more processors 204. In some embodiments, tracking module 210 can additionally include functionality required to perform at least part of the methods and method steps described herein. In some embodiments, the one or more tracking modules 210 are also configured to generate and/or store (at least temporarily) some or all of the tracking data utilized by the computing system 102.

IV. Tracking and Editing Computing System and Architecture

In the following sections, references will be made, in some detail, to various embodiments of the systems and methods disclosed herein. Although the following detailed descriptions provide many details to provide a context to ensure a full understanding of the present disclosure for the reader, these descriptions should not be viewed as limitations. Further, the disclosed systems and methods may be accomplished without all of these specific details.

Figure 3:
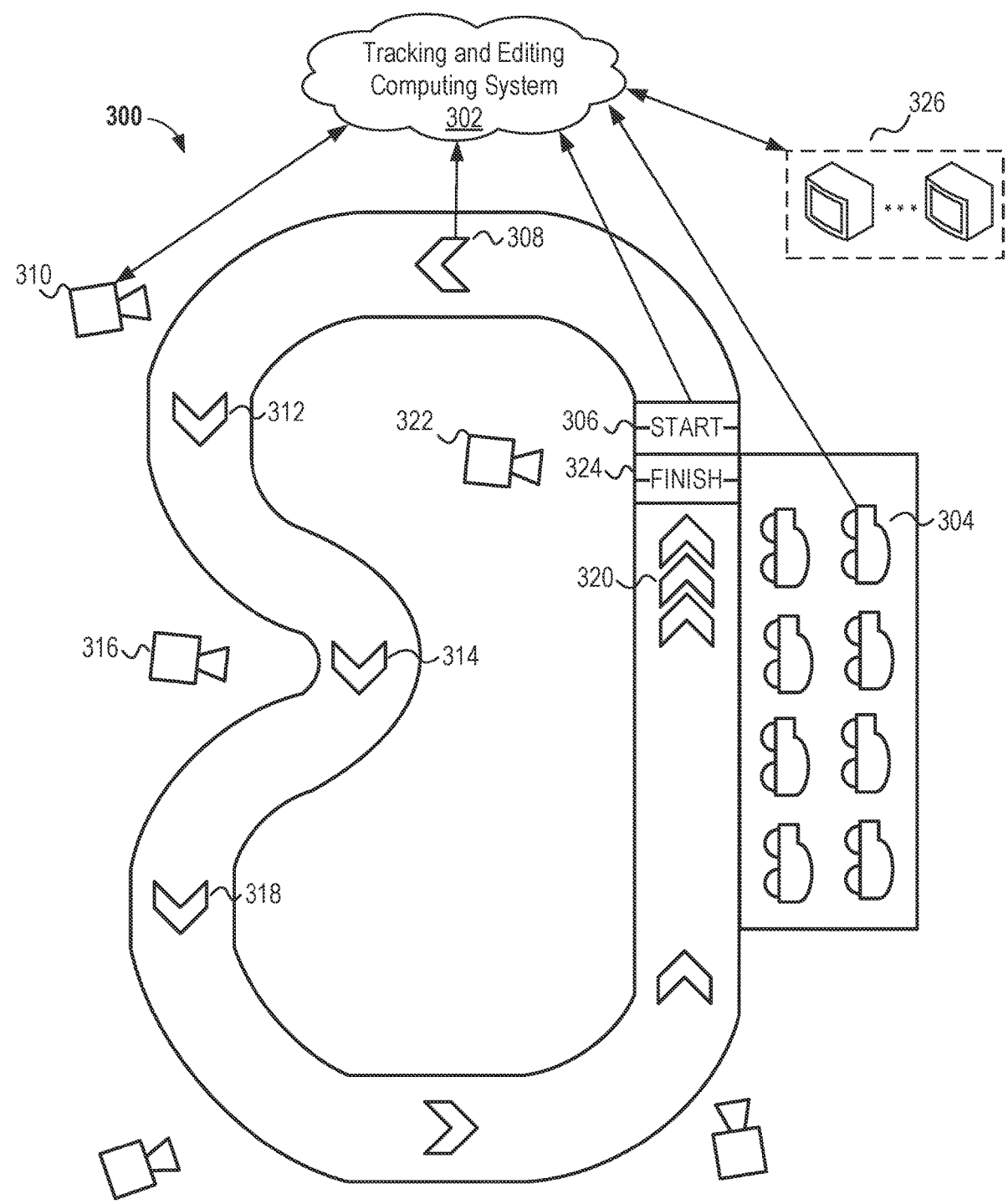
FIG. 3 depicts an example tracking and editing computing system and architecture, in accordance with example embodiments.

FIG. 3 shows a system 300, in accordance with example embodiments. More specifically, system 300 includes several tracking devices (some of which are shown in FIG. 3 as vehicle tracking device 304, start position tracking device 306, first course position tracking device 308, second course position tracking device 312, third course position tracking device 314, fourth course position tracking device 318, near finish course position tracking device 320, and finish course position tracking device 324), at least some of which are in communication with tracking and editing computing system 302. In a further aspect, FIG. 3 shows several cameras (some of which are shown in FIG. 3 as first camera 310, second camera 316, and third camera 322), at least some of which are also in communication with tracking and editing computing system 302. In yet a further aspect, tracking and editing computing system 302 is also in communication with distribution devices 326. In a further aspect, in this example, computing system 302 includes one or more of the components illustrated in FIGS. 1 and 2 (e.g., video processing engines 108, a stock media library 110, media database 112, tracking engine 114, and/or controller 116, as shown in FIG. 1). Furthermore, in some embodiments, one or more of these components may be encased in one or more weatherproof units.

In some embodiments, tracking and editing computing system 302 receives tracking data associated with a tracked event. As shown in FIG. 3, tracking and editing computing system 302 receives tracking data associated with a tracked event, a go-kart race on a go-kart track. In one aspect, tracking and editing computing system 302 receives tracking data from vehicle tracking device 304, which is positioned on a recreational vehicle (e.g., a go-kart shown in FIG. 3 in the "pit," an area where racing vehicles are often kept before and after a race). Once a participant engages the vehicle with the vehicle tracking device 304, tracking data associated with that vehicle (e.g., position, speed, etc.) may be transmitted to tracking and editing computing system 302 from vehicle tracking device 304. Based on this tracking data from vehicle tracking device 304, the tracking and editing computing system 302 may take one or more responsive actions. For example, based on receiving tracking data from the vehicle tracking device 304, tracking and editing computing system 302 may create one or more profiles associated with the participant and/or vehicle containing the vehicle tracking device 304. Additionally or alternatively, based on receiving tracking data from the vehicle tracking device 304, tracking and editing computing system 302 may initiate the automated video processing procedure described, at least, in FIG. 1. Other examples are possible.

For example, in another example embodiment tracking and editing computing system 302 may receive tracking data from start position tracking device 306, which is positioned on or at the starting line of the track (shown in FIG. 3 as the "START" line, an area where racing vehicles go after leaving the pit, and where the tracked event/race begins). Once the participant/recreational vehicle crosses the "START" line, start position tracking device may transmit tracking data associated with that vehicle (e.g., data indicating the vehicle has crossed the "START" line, vehicle position and speed, etc.) to tracking and editing computing system 302. In some examples, start position tracking device 306 may be made up of one or more devices that indicate that the vehicle has crossed the "START" line, including one or more electronic gates, photo sensors, cameras, motion sensors, infrared beam sensor, and/or electronic sensors, including RFID tags and sensors, any or all of which may be imbedded into the track itself. In a further aspect, based on receiving this tracking data from start position tracking device 306, the tracking and editing computing system 302 may take one or more responsive actions. For example, based on receiving tracking data from the start position tracking device 306, tracking and editing computing system 302 may create one or more profiles associated with the participant and/or vehicle crossing the "START" line and/or otherwise interacting start position tracking device 306. Additionally or alternatively, based on receiving tracking data from the start position tracking device 306, tracking and editing computing system 302 may initiate the automated video processing procedure described, at least, in FIG. 1. Other examples are possible.

In a further aspect, once the tracking and editing computing system 302 receives tracking data from the vehicle tracking device 304 and/or the start position tracking device 306 and initiates the automated video processing procedure, the computing system may take one or more additional responsive actions using the components illustrated in FIG. 3. For example, tracking and editing computing system 302 may initiate one or more live feeds from one or more cameras placed around the track. For example, as shown in FIG. 3, once the tracking and editing computing system 302 receives tracking data from the vehicle tracking device 304 and/or the start position tracking device 306, the computing system might initiate a live video feed from first camera 310. In an example embodiment, once the vehicle crosses the "START" line and turns the corner towards first course position tracking device 308, the vehicle will be in the field of view of first camera 310, and, thus, a subject of the footage streamed and/or recorded by first camera 310 and sent to computing system 302.

In a further aspect, tracking and edit computing system 302 may receive updated tracking data from additional tracking devices on the track, the vehicle, or both, and take one or more responsive actions based on this updated tracking data. For example, as the vehicle passes first course position tracking device 308, the computing system 302 may receive the updated tracking data and cause first camera 310 to take one or more additional actions. For example, based on the tracking data from first course position tracking device 308, computing system 302 may cause first camera 310 to capture one or more images from the live video stream. Additionally or alternatively, based on the tracking data from first course position tracking device 308, computing system 302 may cause first camera 310 to switch to a higher quality live video stream (e.g., HD 720 to HD 1080). Additionally or alternatively, based on the tracking data from first course position tracking device 308, computing system 302 may select on or more segments of the live video stream from first camera 310 for further processing. Other examples are possible.

In any event, in these examples, computing system 302 may take the one or more additional actions based on the updated tracking data from first course position tracking device 308 because, when crossing first course position tracking device 308, the vehicle will directly in the field of view of first camera 310. In this regard, a subject of the footage streamed and/or recorded by first camera 310 at a track position corresponding to first course position tracking device 308 may be more desirable.

In a further aspect, as the vehicle continues around the track, tracking and edit computing system 302 may receive updated tracking data from second course position tracking device 312, and take one or more responsive actions based on this updated tracking data. For example, as the vehicle passes second course position tracking device 312, the computing system 302 may cause first camera 310 to disable and/or otherwise end the live video stream (e.g., because the vehicle is out of the field of view of the first camera 310) and also cause second camera 316 to initiate a live video stream (e.g., in order to begin capturing the vehicle, which will be coming into the field of view of second camera 316).

Furthermore, in an example embodiment, based on the tracking data from third course position tracking device 314, computing system 302 may cause second camera 316 to capture one or more images from the live video stream. Additionally or alternatively, based on the tracking data from third course position tracking device 314, computing system 302 may cause second camera 316 to switch to a higher quality live video stream (e.g., HD 720 to HD 1080). Additionally or alternatively, based on the tracking data from third course position tracking device 314, computing system 302 may select on or more segments of the live video stream from second camera 316 for further processing, potentially with one or more segments selected by computing system 302 from the live stream from first camera 310. Other examples are possible.

In a further aspect, in an example embodiment, as the vehicle continues around the track, tracking and edit computing system 302 may receive updated tracking data from fourth course position tracking device 318, and take one or more responsive actions based on this updated tracking data. For example, as the vehicle passes fourth course position tracking device 318, the computing system 302 may cause second camera 316 to disable and/or otherwise end the live video stream (e.g., because the vehicle is out of the field of view of the second camera 316). Other examples are possible.

For example, as the vehicle continues around the track and nears the finish line (shown in FIG. 3 as "FINISH" line), tracking and edit computing system 302 may receive updated tracking data from near finish course position tracking device 320 and/or finish course position tracking device 324. For example, once the recreational vehicle/ participant crosses the "FINISH" line, finish course position tracking device 324 may transmit tracking data associated with that vehicle (e.g., data indicating the vehicle has crossed the "FINISH" line, vehicle position and speed, etc.) to tracking and editing computing system 302. In some examples, finish course position tracking device 324 may be made up of one or more devices that indicate that the vehicle has crossed the "FINISH" line, including one or more electronic gates, photo sensors, cameras, motion sensors, infrared beam sensor, and/or electronic sensors, including RFID tags and sensors, any or all of which may be imbedded into the track itself. In a further aspect, based on receiving this tracking data from finish course position tracking device 324, the tracking and editing computing system 302 may take one or more responsive actions.

For example, as the vehicle passes near finish course position tracking device 320, the computing system 302 may cause all other cameras to disable and/or otherwise end the live video streams (e.g., because the vehicle is about to cross the "FINISH" line and finish the race) and also cause third camera 322 to initiate a live video stream (e.g., in order to begin capturing the vehicle, which will be crossing the "FINISH" line directly in the field of view of third camera 322).

Furthermore, in an example embodiment, based on the tracking data from updated tracking data from near finish course position tracking device 320 and/or finish course position tracking device 324, computing system 302 may cause third camera 322 to capture one or more images from the live video stream, some of which may include images and/or higher resolution video segments of vehicle crossing the finish line. Additionally or alternatively, based on the tracking data from near finish course position tracking device 320, computing system 302 may cause third camera 322 to switch to a higher quality live video stream (e.g., HD 720 to HD 1080) and/or select on or more segments of the live video stream from third camera 322 for further processing, potentially with one or more segments selected by computing system 302 from the live stream from third camera 322. Other examples are possible.

For example, once the vehicle passes the "FINISH" line, finish course position tracking device 324 may transmit tracking data to computing system 302 that causes the computing system to modify the selected one or more video segments and begin to compile a video of the tracked event using video segments from first camera 310, second camera 316, and third camera 322, among others. Based on this tracking data from finish course position tracking device 324, the computing system 302 may also generate a graphical indication of one or more events that occurred during the tracked event, some or all of which are based on tracking data received during the tracked event and combine these generated graphical representations with the video segments and/or images selected from the live video streams of the tracked event. Additionally or alternatively, on this tracking data from finish course position tracking device 324, the computing system 302 may also select one or more stock video segments from a library of previously recorded stock video segments based on one or more events that occurred during the track. Like the generated graphical representations, some or all of the stock video segments may be combined with the video segments and/or images selected from the live video streams of the tracked event to create a video of the tracked event.

In still other examples, the tracking data received by computing system 302 may be used to facilitate compiling the selected video segments, graphical representations, and/or stock video segments in a manner that allows the compiled video of the tracked event to reflect an ordered sequence of events (e.g., showing the vehicle racing around the track and crossing the "FINISH" line). The computing system 302 may do so in a number of ways. For example, the computing system may use the tracking data received from the tracking devices in FIG. 3 to determine the time at which each video stream, video segment, and/or image was generated and create a time stamp associated with each video stream, video segment, and/or image. Furthermore, in an example, the computing system 302 may use these timestamps to order the video stream, video segments, and/or images when compiling the video that is made of these video streams, video segments, and/or images. The computing system 302 may also use these timestamps to select corresponding stock video segments and/or images that share tracking data, timestamps, and/or other characteristics with each video stream, video segment, and/or image to use in compiling the video of the tracked event. In this regard, the computing system 302 may compile all of the video segments (stock or recorded during the event), graphical representations, and/or images (stock or captured during the event) in a manner that appears to be footage of the tracked event.

In a further aspect, the computing system may also alter these the video segments (stock or recorded during the event), graphical representations, and/or images (stock or captured during the event) in a manner that appears to be footage of the tracked event. Specifically, one or both of these video segment types may be altered by adjusting the playback speed of the video segments, and/or one or more of the following parameters associated with the video segments: brightness, contrast, grading, saturation, color balance, or image filter parameters. Under any of these scenarios, however, by adjusting these parameters, the computing system may achieve a more consistent look/visual appearance across all of the video segments, graphical representations, and/or images.

In any event, once the video of the tracked activity has been completed and the video is ready to be transferred, the video may be stored in one or more media databases of tracking and editing computing system 302, which may serve as both a repository for finished videos (e.g., a storage device for such videos), output interface (e.g., network interface), or both. In a further aspect, computing system may then transmit the finished video to one or more destination devices 326 (e.g., mobile devices, computing devices, kiosks, and/or other devices associated with the user, the participant, or another party) for previewing by (or transfer/sale to) the participant after the race. In other embodiments, the finished video may be uploaded to a website for later download by a party, such as the participant. In other embodiments, based on creating an associated user profile at the beginning of the race, the video may also be transferred directly to the participant's portable electronic device and/or an electronic device associated with the user profile (e.g., camera, smart phone, tablet computer, or other portable electronic device).

In still other example embodiments, with multiple vehicles participating in a tracked event, the computing system 302 may use the tracking data associated with each of the vehicles in the tracked event to create videos that are individualized for each vehicle and participant, as well as videos, graphical representations, and/or images that reflect the participation of all participants in the tracked event. For example, based on the tracking data for each vehicle in the tracked event, the computing system may generate a graphical representation of a ranked leaderboard showing the results of the tracked event and use data associated with each participant to supplement the graphical representation (e.g., one participant's photo next a "FIRST PLACE: CHAMPION" graphic and/or total time to finish the race and another participant's photo next a "SECOND PLACE: RUNNER UP" graphic and/or total time to finish the race). In this regard, the participants may all view the results of the tracked and elect to buy and/or otherwise transfer videos and/or images that are finished and ready for transfer by the time the participants leave the vehicles and interact with the destination devices. Other examples are possible.

V. Method Flowchart and Example Embodiments

Figure 4:
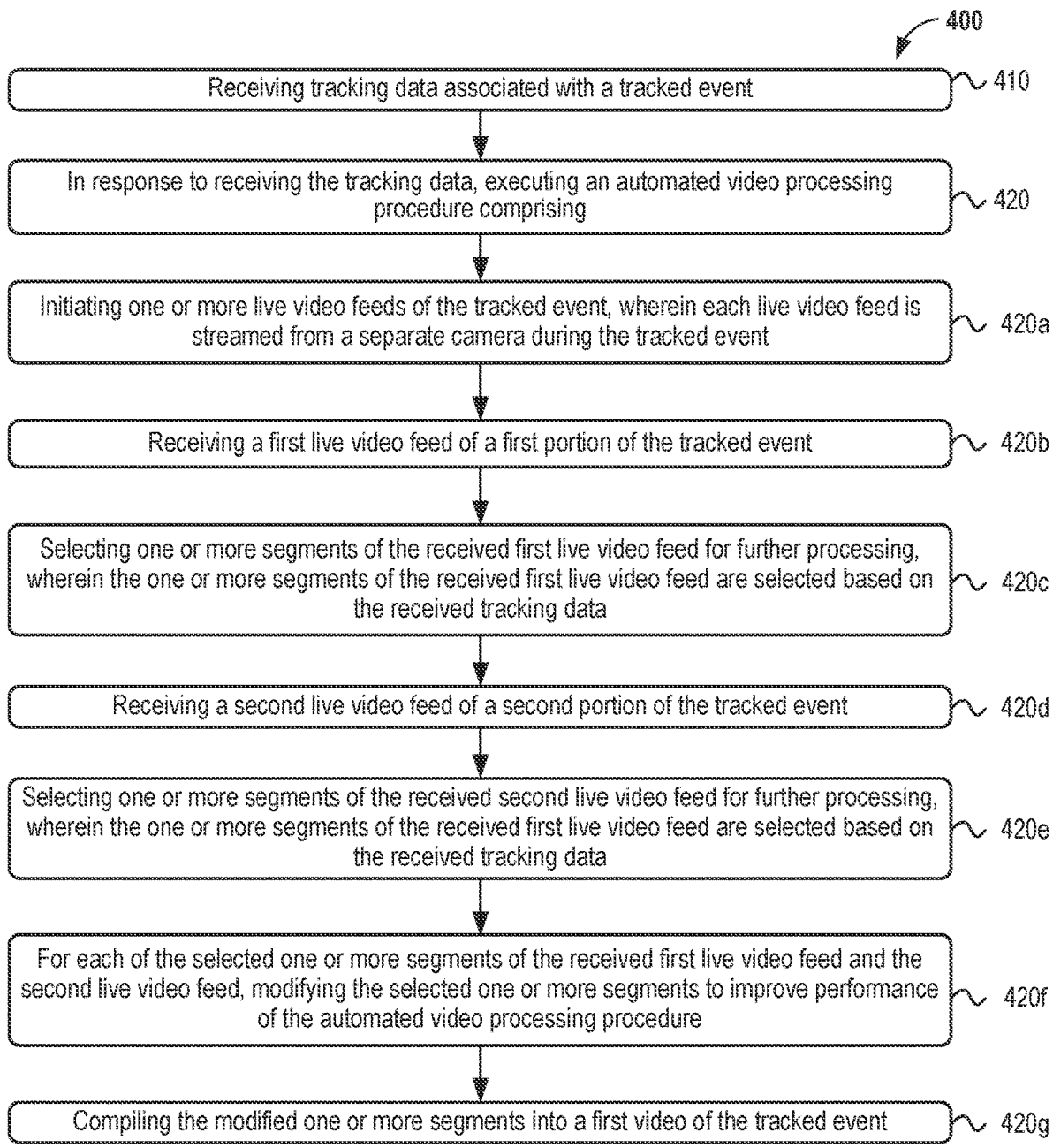
FIG. 4 is a flowchart of a method, in accordance with example embodiments.

FIG. 4 illustrates a flowchart showing an example method 400 executed by the computing system to capture, alter, and compile video segments into a first video of a tracked even. Method 400 may be carried out by one or more computing devices, such as computing system 102, computing device 200, and/or computing system 300, as illustrated and described with respect to FIGS. 1, 2, and 3. In additional examples, method 400 may be carried out by computing system 102, computing device 200, and/or computing system 300, operating as part of a cloud-based computing system. Additionally, method 400 may be performed by one or more other types of computing systems and devices other than those illustrated in FIGS. 1, 2, and 3.

Further, the functionality described in connection with the flowcharts described herein can be implemented via one or more parts or components of the computing systems and computing devices illustrated in FIG. 1 (e.g., video processing engine 108, tracking engine 114, and/or controller 116), FIG. 2 (e.g., processors 204, data storage device 206 with computer-readable instructions 208, and/or tracking module 210), and/or FIG. 3 (e.g., tracking and editing computing system 302, vehicle tracking device 304, start position tracking device 306, first course position tracking device 308, second course position tracking device 312, third course position tracking device 314, fourth course position tracking device 318, near finish course position tracking device 320, and finish course position tracking device 324, first camera 310, second camera 316, and third camera 322, and/or distribution devices 326).

Moreover, for each block of the flowchart illustrated in FIG. 4, the circuitry and/or components shown in and described with reference to FIGS. 1, 2, and 3 allows each block to be performed under the functionality of the specific component, as well as part of the functionality of the device on which the specific component is implemented. Further, the blocks of the flowchart illustrated in FIG. 4 may be executed in or out of the order shown, as long as the overall functionality of the described method is maintained.

At block 410, method 400 includes receiving tracking data associated with a tracked event. In some embodiments, the computing system receives the tracking data as illustrated in FIGS. 1, 2, and 3.

In some examples, in response to receiving the tracking data, the computing system performs one or more aspects of an automated (or at least semi-automated) video processing procedure. In some embodiments, after the computing system receives the tracking data, the computing system may not undertake more than one automated (or at least semi-automated) video processing procedure until the automated video processing procedure is completed (e.g., for one vehicle/participant of the tracked event). In other examples, however, after the computing system receives tracking data corresponding to one vehicle/participant, the computing system may receive tracking data corresponding to one or more additional vehicles/participants in the tracked event, some or all of which may require their own individual automated (or at least semi-automated) video processing procedure, in spite of the non-completion of the first automated video processing procedure already initiated by the computing system.

For example, during an automated video processing procedure concerning a first video of a vehicles/participants, the computing system may receive tracking data corresponding to one or more additional vehicles/participants in the tracked event and coordinate all system architecture (e.g., the cameras illustrated in FIG. 3) based on tracking data corresponding to each vehicle/participant. In one example, the computing system may undertake several automated (or at least semi-automated) video processing procedures in parallel, each of which may correspond to each vehicle/participant. In other examples, the computing system may prioritize certain automated (or at least semi-automated) video processing procedures corresponding to different vehicles/participants. For example, from the outset of the tracked event, some participants may pay a premium to have their corresponding video of the tracked event prioritized for faster completion. In other examples, based on receiving tracking data for a vehicle/participant that ends the tracked event early (e.g., by wrecking the vehicle), the computing system may prioritize or discontinue the automated (or at least semi-automated) video processing procedure corresponding to that participant (e.g., because no further video segments are required).

At block 420, method 400 further includes, in response to receiving the tracking data, executing a first automated video processing procedure. In operation, the video processing procedure engages the computing system to perform a variety tasks that cause the computing system to capture, alter, and compile video segments into a video of a tracked activity.

For example, at block 420a, method 400 includes initiating one or more live video feeds of the tracked event. In some but not all embodiments, each live video feed is obtained from a separate camera. In operation, the computing system may receive one or more live video feeds using devices and systems such as those illustrated in FIGS. 1, 2, and 3. In some embodiments, the computing system does not need to request the separate cameras to begin recording or transmitting video. Instead, the computing system obtains the one or more live video feeds by receiving live video feeds for one or more separate cameras that are each transmitting live video feeds to the source network 106 (FIG. 1).

At block 420b, method 400 includes receiving a first live video feed of a first portion of the tracked event.

At block 420c, method 400 includes selecting one or more segments of the received first live video feed for further processing. In particular, the computing system may select one or more live video feeds received from one or more of the separate cameras based on the received tracking data, by referencing a predetermined script, or a combination of the two.

At block 420d, method 400 includes receiving a second live video feed of a second portion of the tracked event.

At block 420e, method 400 includes selecting one or more segments of the received second live video feed for further processing. In particular, the computing system may select one or more live video feeds received from one or more of the separate cameras based on the received tracking data, by referencing a predetermined script, or a combination of the two.

In other embodiments, the computing system may select the one or more live video feeds based on a combination of tracking data and a set of time-based intervals. More specifically, once the computing system receives the tracking data, the computing system may initiate a live stream for one or more cameras corresponding that tracking data for a predetermined duration of time (e.g., initiating a live video stream from a first camera for 20 seconds, then initiating a live video stream from a second camera for 20 seconds).

At block 420f, method 400 further includes, for each of the selected one or more segments of the received first live video feed and the second live video feed, modifying the selected one or more segments to improve performance of the automated video processing procedure. In particular, the computing system may modify the selected one or more segments in one or more ways that improve the computing system's ability to accurately and efficiently execute the automated video procedure.

For example, in some embodiments, the computing system modifies the one or more segments by one or more data processing techniques, filters, and/or similar technologies. For example, to improve performance of the automated video processing procedure, the computing system may compress the one or more selected segments individually, as a group, or by some other categorization. More particularly, the computing system may compress these selected segments by reducing the overall file size. In other examples, the file size of the segments may be compressed by converting portions of the segments to different file or video formats. In other embodiments, the computing system may modify the selected segments in other ways (e.g., re-encoding, motion blur reduction, color/contrast adjustments, culling mechanisms, etc.).

In a further aspect, these segments may be generated and/or stored in a variety of formats, including: Video MPUs (.MPU), Audio Video Interleave (.AVI) format, Flash Video (.FLV) format, Windows Media Video (.WMV) format, Apple QuickTime Movie (.MOV) format, Moving Pictures Expert Group 4 (.MP4) format, and/or other similar video formats, depending on the specific scenario for which the computing system will ultimately utilize the one or more segments.

At block 420g, method 400 further includes compiling the modified one or more segments into a first video of the tracked event. In particular, the computing system may compile the one or segments into a first video of the tracked event by combining the one or more segments directly (e.g., stitching the segments together in a particular order) and/or in combining them with other segments (e.g., previously recorded stock video segments).

In other embodiments, the computing system may compile the one or more segments with stock video and/or audio segments, generated graphical representations of the tracked event, images captured during the tracked event, and/or stock images, all or some of which may be selected and/or modified based on tracking data received by the computing system during the tracked event. Under any of these scenarios, utilizing the tracking data results in a compiled video that depicts an ordered sequence of events that is representative of the captured activity.

In other embodiments, the computing system may adjust an operational parameter of the automated video processing procedure based on the tracking data. For example, based on the tacking data, the computing system may adjust at least one of the following operational parameter of the automated video processing procedure: (i) a duration of the first live video feed of the first portion of the tracked event; (ii) a duration of the second live video feed of the second portion of the tracked event; (iii) a modification of the selected one or more segments of the received first live video feed and the second live video feed to improve performance of the automated video processing procedure; and (iv) an order of compilation for the modified one or more segments into the first video of the tracked event.

IV. Further Example Embodiments

In other embodiments, the methods described herein may further include disabling the received first and second live video feeds of the tracked event, wherein the live video feeds are disabled based on tracking data indicating that the tracked event has ended.

In a further aspect, because each displayed live video feed is obtained from a separate camera, this information may be helpful for the user to review.

In other embodiments, the methods described herein may further include the computing system selecting a set of images from one or more of the selected segments. In a further aspect, the selection of these images may be based on: a predetermined script the computing system may reference (e.g., selecting an image at the top of every second over a 20-second video segment), input from the user (e.g., user input indicating the selection of one or images displayed on the computing system as part of a displayed live video feed), and/or some other related technology or system input. In a further aspect, the computing system may also save the selected images in one or more places (e.g., a virtual folder).

In other examples, the methods described herein may further include the computing system storing a copy of the finalized video (e.g., the first video of the tracked activity) in a tangible, non-transitory readable memory of the computing system. In a further aspect, the storage of this video may be duplicative (e.g., storing a first copy of the video in a first tangible, non-transitory computer-readable memory of the computing system and storing a second copy of the video in a second tangible, non-transitory computer-readable memory of a separate computing system).

In a further aspect, a copy of this video may be provided to a participant of the captured video in a variety of ways, including: stored on a mobile storage device (e.g., a USB flash drive, a cloud-based storage system, etc.), uploading the video to a website or physical kiosk for the participant's review and selection, uploading the video to a social media site/service associated with the user, the participant, or some other party, or transferred to a device associated with the user, the participant, or some other party (e.g., a camera, smart phone, tablet or other computing device), among other scenarios. Additionally, although such duplicative transfer and/or storage may improve convenience for the user, the participant, or some other party, these copies may also be used as backup redundant copies in the event of a failure or destruction of one of the aforementioned devices. Further, although these example embodiments generally relate to one activity participant, they apply to groups of activity participants as well (e.g., for a group of ten participants, there may be ten videos and/or related media created and transmitted via WIFI to a kiosk at visitation center, where all ten participants may review and/or purchase placed one or more of the aforementioned finalized product).

In a further aspect, the computing system may also manage the steps of the automated video processing steps to reduce the likelihood that critical data might be lost during the execution of one or both of the automated video processes. For example, the computing system may facilitate this management by executing the first and second automated video processing procedures at the same time (e.g., by parallel processing or other similar processing techniques), and may potentially execute a third, fourth, fifth, or more automated video processing procedures in a similar fashion.

In other examples, the computing system may prioritize one or more of the second automated video procedure's steps over the completion of one or more of the steps in the first automated video procedure. In these examples, in general, the highest priority steps of the first and second automated video processing procedures relate to capture, with lower priority given to the steps relating to processing and/or editing captured video. For example, in some embodiments, the computing system prioritizes execution of a second automated video procedure's steps of (i) initiating one or more live video feeds of the tracked event and (ii) receiving a first live video feed of a first portion of the tracked event, over one or more of the first automated video processing procedure's steps of (i) selecting one or more segments of the received first live video feed for further processing, (ii) modifying the selected one or more segments to improve performance of the automated video processing procedure, and (iii) compiling the modified one or more segments into a first video of the tracked event.

In other embodiments, the methods described herein may include the computing system calibrating its functionality, as well as the functionality of associated hardware and devices, before, during, or after engaging in the steps of other methods described herein by undertaking a variety of testing sequences.

For example, to ensure the consistency and functionality of the live video feeds received and/or the video segments selected therefrom, the computing system may engage in a calibration sequence. Specifically, the computing system may obtain a first calibration video segment from each camera associated with the computing system and then compare the first calibration video segment to a corresponding reference video segment. In a further aspect, the computing system may also determine one or more camera configuration parameters (e.g., brightness, contrast, saturation, color balance, filters, and/or other parameters) to achieve consistency between the video segments and then configure each camera with one or more of the determined parameters. In yet a further aspect, to ensure this consistency, the computing system may repeat this procedure (potentially more than once) over the term of use of the system, and may also display one or more of the camera's corresponding first calibration video segment, a second calibration video segment, the reference video segments, and/or one or more notifications identifying problems (e.g., defective components).

In other embodiments, this calibration sequence may also be performed by referencing one or more stock video segments. Specifically, in response to selecting one or more stock video segments from a library of previously recorded stock video segments, the computing system may obtain a first calibration video segment from each camera associated with the computing system and then compare the first calibration video segment to a corresponding reference stock video segment. In a further aspect, the computing system may also determine one or more camera configuration parameters (e.g., brightness, contrast, saturation, color balance, filters, and/or other parameters) to achieve consistency between the video segments and then configure each camera with one or more of the determined parameters. In yet a further aspect, to ensure this consistency, the computing system may repeat this procedure (potentially more than once) over the term of use of the system, and may also display one or more of the camera's corresponding first calibration video segment, a second calibration video segment, the reference stock video segments, and/or one or more notifications identifying problems (e.g., defective components) for the user's review.

In other embodiments, the computing system may ensure its functionality, as well as the functionality of the associated cameras by comparing, for each separate camera, that camera's field of view against a corresponding reference field of view. In a further aspect, in response to undertaking the comparison, the computing system may adjust one or more individual camera's field of view to ensure consistency between that camera's field of view and its corresponding reference field of view. In yet a further aspect, after adjusting each separate camera's field of view, for each camera, the computing system may display (via the user interface of the computing system or otherwise) one or more camera's adjusted field of view and/or its corresponding reference field of view for the user's review, allowing the user to visually confirm capture timings and other parameters of the system and adjust the camera angles to optimize the resulting quality of the videos produced therefrom.

Finally, while it is true that a number of the aspects, examples, and embodiments of the claimed invention have been disclosed herein, it is also true that other aspects, examples, and embodiments of the claimed invention will be readily apparent to those skilled in the art. Accordingly, the aspects, examples, and embodiments of the claimed invention disclosed herein are provided for the purpose of explanation only, and should not be interpreted to be limiting. Instead, the most accurate and true scope of the claimed invention are captured in the following claims.

What is claimed is:

1. A method implemented by a computing system, the method comprising:
   receiving tracking data associated with a tracked event; and
   in response to receiving the tracking data, executing an automated video processing procedure comprising:
   (i) initiating one or more live video feeds of the tracked event, wherein each live video feed is streamed from a separate camera during the tracked event;
   (ii) receiving a first live video feed of a first portion of the tracked event;
   (iii) selecting one or more segments of the received first live video feed for further processing, wherein the one or more segments of the received first live video feed are selected based on the received tracking data;
   (iv) receiving a second live video feed of a second portion of the tracked event;
   (v) selecting one or more segments of the received second live video feed for further processing, wherein the one or more segments of the received first live video feed are selected based on the received tracking data;
   (vi) for each of the selected one or more segments of the received first live video feed and the second live video feed, modifying the selected one or more segments to improve performance of the automated video processing procedure; and
   (vii) compiling the modified one or more segments into a first video of the tracked event.

2. The method of claim 1, further comprising disabling the received first and second live video feeds of the tracked event, wherein the live video feeds are disabled based on tracking data indicating that the tracked event has ended.

3. The method of claim 1, further comprising adjusting at least one operational parameter of the automated video processing procedure based on the received tracking data.

4. The method of claim 3, wherein the at least one operational parameter of the automated video processing procedure comprises one or more of the following: (i) a duration of the first live video feed of the first portion of the tracked event; (ii) a duration of the second live video feed of the second portion of the tracked event; (iii) a modification of the selected one or more segments of the received first live video feed and the second live video feed to improve performance of the automated video processing procedure; and (iv) an order of compilation for the modified one or more segments into the first video of the tracked event.

5. The method of claim 1, wherein compiling the modified one or more segments into a first video of the tracked event further comprises:
   selecting one or more stock video segments from a library of previously recorded stock video segments; and
   interleaving a least a portion of the modified one or more segments with at least a portion of one or more stock video segments, thereby causing the first video to depict an ordered sequence of events representative of the tracked event.

6. The method of claim 5, further comprising altering the stock video segments so that the modified one or more segments and the one or more stock video segments all appear to be footage from the tracked event.

7. The method of claim 6, wherein altering the stock video segments so that the one or more modified video segments and the one or more stock video segments all appear to be footage from the tracked event comprises:

adjusting playback speed and/or one or more brightness, contrast, grading, saturation, color balance, or image filter parameters to achieve a consistent look across the one or more modified video segments and the one or more stock video segments.

8. The method of claim 5, further comprising altering the modified one or more segments and the one or more stock video segments so that the modified one or more segments and the one or more stock video segments all appear to be footage from the tracked event.

9. The method of claim 8, wherein altering the modified video segments and the stock video segments so that the one or more modified video segments and the one or more stock video segments all appear to be footage from the tracked event comprises:
adjusting playback speed and/or one or more brightness, contrast, grading, saturation, color balance, or image filter parameters to achieve a consistent look across the one or more modified video segments and the one or more stock video segments.

10. The method of claim 5, wherein the library of stock video segments includes individual stock video segments recorded in different environmental conditions, and wherein selecting one or more stock video segments from the library comprises selecting stock video segments recorded in the same environmental conditions as the modified one or more segments.

11. The method of claim 5, wherein selecting one or more stock video segments from a library of previously recorded stock video segments comprises:
selecting one or more stock video segments from the library of previously recorded stock video segments based on a previously-received indication of environmental conditions for the tracked events.

12. The method of claim 5, further comprising:
in response to selecting one or more stock video segments from a library of previously recorded stock video segments, for each separate camera, obtaining a first calibration video segment from each separate camera; and
for each first calibration video segment from each separate camera, (i) comparing the first calibration video segment to a corresponding reference stock video segment, (ii) determining one or more camera configuration parameters to achieve a consistent look between the first calibration video segment and the corresponding reference stock video segment, and (iii) configuring the separate camera that recorded the first calibration video segment with the determined one or more camera configuration parameters.

13. The method of claim 12, further comprising, after configuring each separate camera with its determined one or more configuration parameters:
obtaining a second calibration video segment from each separate camera; and
for each separate camera, displaying one or more of the camera's corresponding first calibration video segment, second calibration video segment, and reference video segment to a user for review.

14. The method of claim 1, further comprising:
for each separate camera, comparing that camera's field of view against a corresponding reference field of view and adjusting that camera's field of view to match the corresponding reference field of view.

15. The method of claim 14, further comprising, after adjusting each separate camera's field of view to match the reference field of view:
for each separate camera, displaying one or more of the camera's adjusted field of view and the reference field of view to a user for review.

16. The method of claim 1 further comprising displaying the one or more received live video feeds of the tracked event, wherein each live video feed is obtained from a separate camera, to a user for review.

17. The method of claim 16, further comprising:
receiving, from the user, a selection of an image in one or more of the displayed live video feeds; and
saving the selected image in a displayed images folder in response to receiving the selection of the image in the one or more displayed live video feeds.

18. The method of claim 1, further comprising:
selecting a set of images from one or more of the selected one or more segments of the received first live video feed and the second live video feed; and
saving the set of images in a first collected images folder.

19. The method of claim 1, wherein for each of the selected first and second live video feeds, modifying the selected video feed to improve performance of an automated video processing procedure further comprises:
one or more of (i) compressing a received live video feed and (ii) selecting a portion of the received first and second live video feeds or the modified one or more segments for incorporation into the first video.

20. The method of claim 1, further comprising:
storing a first copy of the first video of the tracked event in a first tangible, non-transitory computer-readable memory of the computing system;
storing a second copy of the first video of the tracked event in a second tangible, non-transitory computer-readable memory of a separate computing system; and
providing one of the first copy or the second copy of the first video to a participant of the tracked event.

21. The method of claim 1, further comprising:
in response to compiling the modified one or more segments into a first video of the tracked event, generating a graphical representation of one or more events that occurred during the tracked event, wherein the graphical representation is based on the tracking data received during the tracked event; and
overlaying the graphical representation on a least a portion of the modified one or more segments, thereby causing the first video to simultaneously depict an a portion of the tracked event and the generated graphical representation.

22. The method of claim 1, further comprising:
in response to compiling the modified one or more segments into a first video of the tracked event, generating a graphical representation of one or more events that occurred during the tracked event, wherein the graphical representation is based on the tracking data received during the tracked event; and
interleaving the graphical representation with a least a portion of the modified one or more segments, thereby causing the first video to depict an ordered sequence of events representative of the tracked event.

* * * * *